United States Patent
Hardy et al.

(10) Patent No.: US 11,072,327 B2
(45) Date of Patent: Jul. 27, 2021

(54) KNOWN LANE INTERVALS FOR AUTOMATED DRIVING

(71) Applicant: Robert Bosch GmbH, Stuttgart (DE)

(72) Inventors: Jason S. Hardy, Union City, CA (US); Joerg Mueller, Mountain View, CA (US); Mithun Jacob, Santa Clara, CA (US); Jingru Luo, Sunnyvale, CA (US); Jan Kleindieck, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 16/293,791

(22) Filed: Mar. 6, 2019

(65) Prior Publication Data
US 2019/0276017 A1    Sep. 12, 2019

Related U.S. Application Data

(60) Provisional application No. 62/639,741, filed on Mar. 7, 2018.

(51) Int. Cl.
| | | |
|---|---|---|
| *B60W 30/12* | (2020.01) | |
| *B60W 30/18* | (2012.01) | |
| *B62D 15/02* | (2006.01) | |
| *G06K 9/00* | (2006.01) | |
| *G08G 1/16* | (2006.01) | |

(52) U.S. Cl.
CPC ......... *B60W 30/12* (2013.01); *G06K 9/00798* (2013.01); *G08G 1/167* (2013.01); *B60W 2555/60* (2020.02)

(58) Field of Classification Search
CPC ...... B60W 30/12; B60W 10/20; B60W 30/18; B62D 15/02; G06F 3/02; G05D 1/02; G08G 1/16; B60C 23/00
See application file for complete search history.

(56) References Cited

U.S. PATENT DOCUMENTS 8,044,782 B2 * 10/2011 Saban .................... B60N 2/002
                                                      340/438
10,710,588 B2 *  7/2020 Geller .................... B60W 50/10
(Continued)

FOREIGN PATENT DOCUMENTS

JP         2016203745 A  * 12/2016  ............ B60W 10/20

OTHER PUBLICATIONS

International Search Report corresponding to International Patent Application No. PCT/US2019/020879 (1 page).

*Primary Examiner* — Yuri Kan
(74) *Attorney, Agent, or Firm* — Maginot, Moore & Beck LLP

(57) ABSTRACT

A method of operating a vehicle includes determining a first plurality of known lane intervals at a first time with a controller of a guidance system of the vehicle, the known lane intervals available to receive the vehicle, determining a plurality of visible lane intervals at a second time after the first time with the controller based on perception data generated by the guidance system, and determining a plurality of occupied lane intervals at the second time with the controller based on the perception data generated by the guidance system. The method further includes determining a second plurality of known lane intervals at the second time as a union of the first plurality of known lane intervals, the plurality of visible lane intervals, and the plurality of occupied lane intervals.

15 Claims, 7 Drawing Sheets

(56) References Cited

U.S. PATENT DOCUMENTS

| | | |
|---|---|---|
| 2009/0102629 A1 | 4/2009 | Kaller et al. |
| 2011/0130936 A1* | 6/2011 | Noda ............... G08G 1/167 |
| | | 701/70 |
| 2015/0194055 A1 | 7/2015 | Maass |
| 2016/0039459 A1 | 2/2016 | Spero et al. |
| 2016/0185388 A1* | 6/2016 | Sim ............... B60W 10/20 |
| | | 701/41 |
| 2016/0300491 A1* | 10/2016 | Fukuda ............... B60R 1/00 |
| 2017/0334446 A1 | 11/2017 | Bosch et al. |
| 2018/0373266 A1* | 12/2018 | Sethu ............... H04W 4/46 |
| 2019/0064934 A1* | 2/2019 | McQuillen ............ G06F 3/0216 |

* cited by examiner

KNOWN LANE INTERVALS FOR AUTOMATED DRIVING

This application claims the benefit of priority of U.S. provisional application Ser. No. 62/639,741, filed on Mar. 7, 2018 the disclosure of which is herein incorporated by reference in its entirety.

FIELD

This disclosure relates to the field vehicles, and, in particular, to making roadway lane changes with a vehicle.

BACKGROUND

Most vehicles on the roadways are controlled by a human operator. An increasing number of vehicles on the roadways, however, have at least some degree of autonomous control and guidance, and are referred to as autonomous vehicles or semi-autonomous vehicles. A fully autonomous vehicle is capable of operating on any roadway and in any weather condition. Whereas, a semi-autonomous vehicle may be capable of controlling only the steering or braking of the vehicle under limited conditions. A fully autonomous vehicle does not require a human operator, and a semi-autonomous vehicle requires a human operator.

Fully automated driving requires a detailed awareness of the current vehicular traffic situation as well as the ability to forecast possible future evolutions of the traffic situation. Human drivers evaluate nearby traffic and make predictions regarding the possible movements of the other motorists and pedestrians. For example, when making a lane change or when merging onto the highway, human drivers make assumptions and predictions regarding the speed and the possible movements of the other motorists. Fully autonomous vehicles must be able to make the same types of predictions in order to operate on the roadways.

SUMMARY

According to an exemplary embodiment of the disclosure, a method of operating a vehicle includes determining a first plurality of known lane intervals at a first time with a controller of a guidance system of the vehicle, the known lane intervals available to receive the vehicle, determining a plurality of visible lane intervals at a second time after the first time with the controller based on perception data generated by the guidance system, and determining a plurality of occupied lane intervals at the second time with the controller based on the perception data generated by the guidance system. The method further includes determining a second plurality of known lane intervals at the second time as a union of the first plurality of known lane intervals, the plurality of visible lane intervals, and the plurality of occupied lane intervals, operating the vehicle in a selected lane and moving the vehicle to an adjacent lane only when the adjacent lane is included in the second plurality of known lane intervals.

According to another exemplary embodiment of the disclosure, a vehicle guidance system for a corresponding vehicle, includes an imaging device configured to generate imaging data of a multi-lane roadway, and a controller operably connected to the imaging device. The controller is configured to (i) determine a first plurality of known lane intervals of the multi-lane roadway at a first time, the known lane intervals available to receive the vehicle, (ii) determine a plurality of visible lane intervals at a second time after the first time based on the image data, (iii) determine a plurality of occupied lane intervals at the second time based on the image data, and (iv) determine a second plurality of known lane intervals at the second time as a union of the first plurality of known lane intervals, the plurality of visible lane intervals, and the plurality of occupied lane intervals. The vehicle is operated in a selected lane of the multi-lane roadway. The controller enables movement of the vehicle to an adjacent lane of the multi-lane roadway only when the adjacent lane is included in the second plurality of known lane intervals.

According to yet another exemplary embodiment of the disclosure, a method of operating a vehicle on a multi-lane roadway includes operating the vehicle in a selected lane of the multi-lane roadway, and determining that a visual lane interval of an adjacent lane of the multi-lane roadway is free from dynamic objects and has an indeterminate rear edge with a controller of a guidance system of the vehicle. The method further includes determining that the visual lane interval is unavailable for receiving the vehicle with the controller, and preventing the vehicle from changing lanes from the selected lane to the visual lane interval of the adjacent lane with the guidance system.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
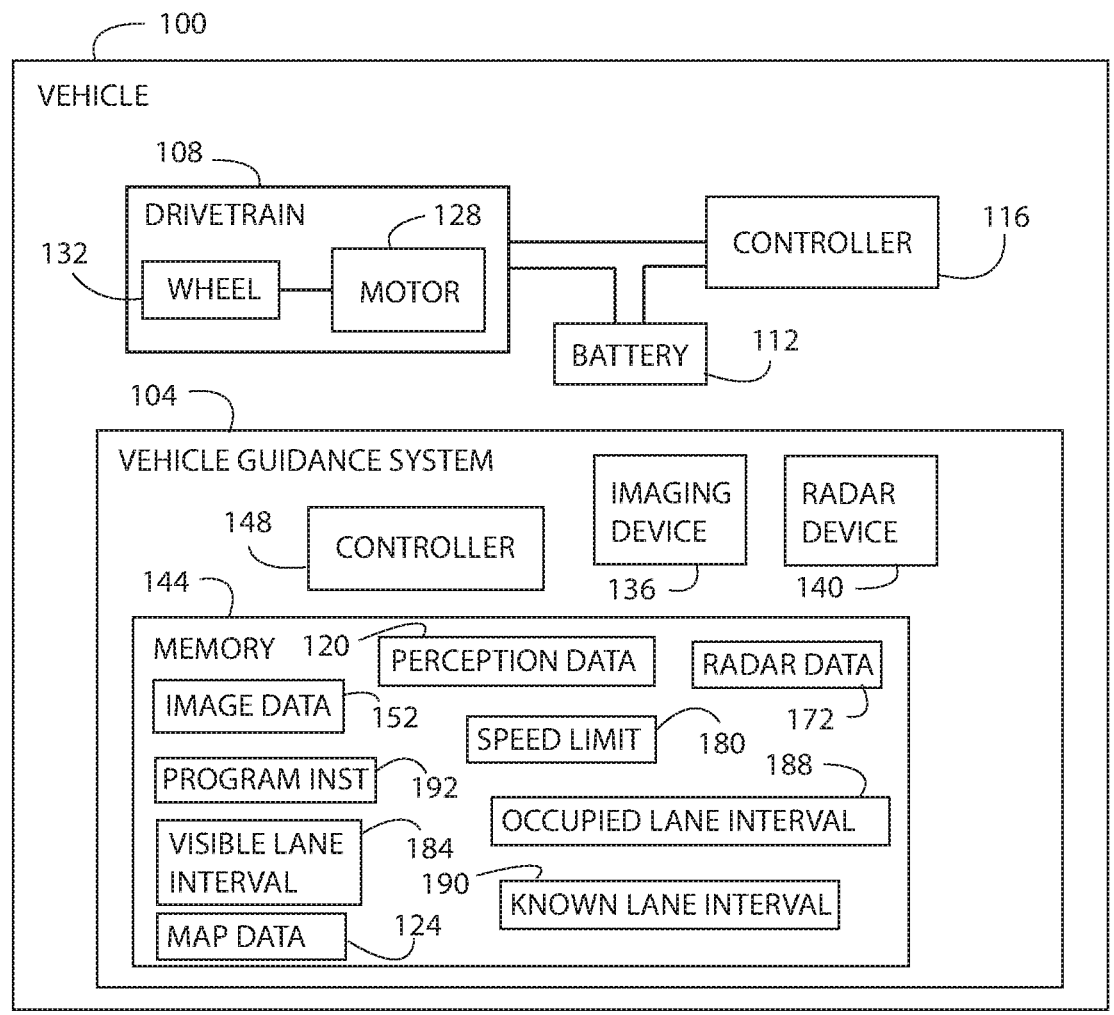
FIG. 1 is a block diagram of a vehicle including a vehicle guidance system, as disclosed herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a vehicle 100 includes a vehicle guidance system 104, a drivetrain 108, and a battery 112 each operably connected to a controller 116. The vehicle guidance system 104 is configured to enable robust situational awareness in complex urban and highway traffic situations such as highway interchanges, multi-lane roads, multi-lane intersections, and traffic circles. The vehicle guidance system 104 uses perception data 120 and map data 124 to assess the traffic situation and to make intelligent driving decisions for the vehicle 100. Each element of the vehicle 100 and the vehicle guidance system 104 is described below.

The drivetrain 108 of the vehicle 100 is configured to generate a force for moving the vehicle 100. In an exemplary embodiment, the drivetrain 108 includes an electric motor 128 operably connected to the battery 112 and to a wheel 132 or wheels of the vehicle 100. The rechargeable battery 112 supplies the electric motor 128 with electrical power for rotating an output shaft (not shown). Rotation of the output shaft of the electric motor 128 causes rotation of the wheel 132, which results in movement of the vehicle 100.

In one embodiment, the vehicle 100 is a fully autonomously-controlled vehicle, and the rotational speed of the electric motor 128 is determined automatically by vehicle guidance system 104. In another embodiment, the vehicle 100 is a semi-autonomous vehicle that is controlled in most conditions and environments by a human operator, but is controllable for automated lane changes by the vehicle guidance system 104. In a further embodiment, the vehicle 100 is fully operator controlled and includes driver assistance features, such as lane monitoring and blind spot detection, as provided by the vehicle guidance system 104, that alert the driver of potentially unwanted lane changes, but that does not control or change a direction of travel of the vehicle 100.

In other embodiments, the motor 128 is an internal combustion engine (ICE) and/or the motor 128 includes an electric motor and an ICE that work together to rotate the wheel 132 as in a hybrid vehicle. Accordingly, the vehicle 100 is provided as any type of vehicle including an autonomous vehicle, an operator-controlled vehicle, an electric vehicle, an internal-combustion vehicle, and a hybrid vehicle.

The controller 116 of the vehicle 100 is configured to execute program instruction data in order to operate the drivetrain 108 and the vehicle guidance system 104, and to charge the battery 112. The controller 116 is provided as at least one microcontroller and/or microprocessor.

With continued reference to FIG. 1, the vehicle guidance system 104 includes an imaging device 136, a radar device 140, and a memory 144 operably connected to a controller 148. The vehicle guidance system 104 generates data for guiding the vehicle 100 in a direction of travel.

Figure 2:
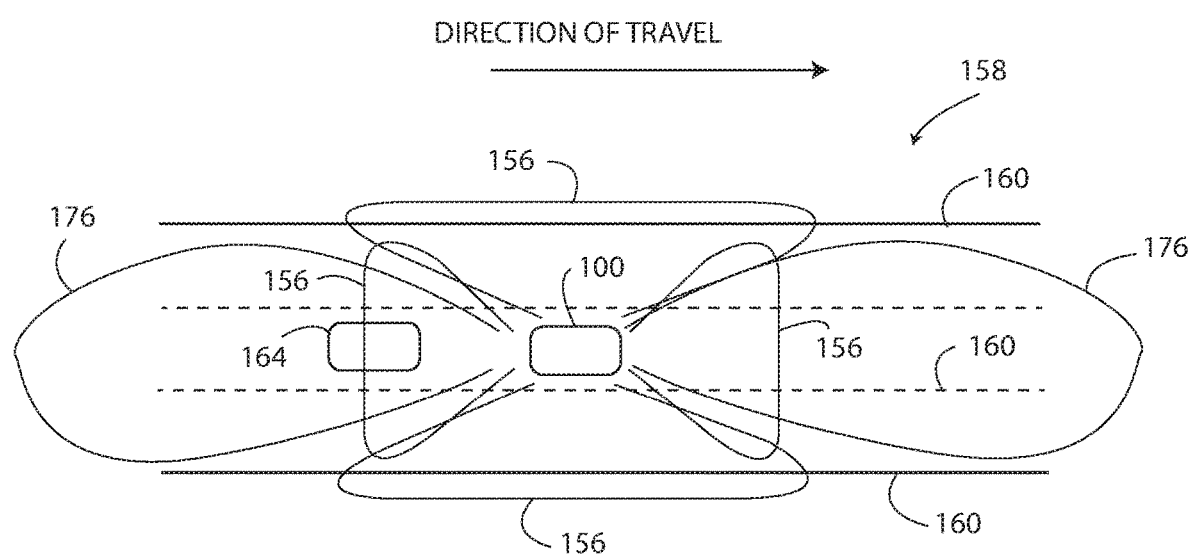
FIG. 2 is a diagram illustrating a top view of the vehicle of FIG. 1 located on a multi-lane roadway including three lanes of travel.

The imaging device 136, which also referred to herein as a camera, a video camera, and a sensor, is configured to generate image data 152 representative of an exterior area around the vehicle 100. In an exemplary embodiment, the vehicle guidance system 104 includes four of the imaging devices 136 including a front, rear, driver, and passenger imaging device 136. As shown in FIG. 2, areas 156 of a multi-lane roadway 158 imaged by each imaging device 136 include front, rear, driver, and passenger areas 156. Each imaging device 136 has a maximum sensing distance of twenty to fifty meters, for example. The imaging device 136 may be configured as a red, green, blue, and depth sensor (i.e. an "RGB-D sensor"), a thermal camera, an infrared camera, and/or a visible light camera. The image data 152 is transmitted from the imaging device 136 to the controller 148 and is stored in the memory 144.

The imaging device 136 is configured to generate image data 152 of static objects and dynamic objects near the vehicle 100. As used herein, "static objects" include non-movable elements and agents, such as traffic lights, roadway signage (such as speed limit signs), and lane markers 160 (FIG. 2). The term "dynamic objects," as used herein, includes movable elements and agents, such as other vehicles, animals, and pedestrians. As shown in FIG. 2, the imaging device 136 located on the rear side of the vehicle 100 is configured to generate image data 152 of the vehicle 164 (i.e. a dynamic object) and the lane markers 160 (i.e. a static object), which are both located in the rear imaging area 156. The imaging device 136 on the front of the vehicle 100 is configured to generate image data 152 of the lane markers 160, which are located in the front imaging area 156. The imaging device 136 on the passenger side of the vehicle 100 is configured to generate image data 152 of the lane markers 160, which are located in the passenger imaging area 156. The imaging device 136 on the driver side of the vehicle 100 is configured to generate image data 152 of the lane markers 160, which are located in the driver imaging area 156.

With reference again to FIG. 1, the radar device 140 is configured to generate radar data 172 representative of the exterior area around the vehicle 100 including dynamic objects and static objects. In an exemplary embodiment, the vehicle guidance system 104 includes two of the radar devices 140 including a front and a rear radar device 140. As shown in FIG. 2, areas 176 of the multi-lane roadway 158 imaged by each radar device 140 include a front and a rear area 176. Each radar device 140 has a maximum sensing distance of ten to one hundred meters, for example. The radar device 140, in an example, is an active radar system that generates radar signals to illuminate target objects, such as the vehicle 164 located in the rear radar area 176. The radar data 172 is transmitted from the radar device 140 to the controller 148 and is stored in the memory 144.

The memory 144 is an electronic storage device that is configured to store at least the perception data 120, the map data 124, the image data 152, the radar data 172, speed limit data 180, visible lane interval data 184, occupied lane interval data 188, known lane interval data 190, and program instruction data 192 for operating the vehicle guidance system 104. The memory 144 is also referred to herein as a non-transient computer readable medium.

The controller 116 of the vehicle guidance system 104 is configured to execute the program instruction data 192 in order to operate the vehicle guidance system 104. The controller 116 is provided as at least one microcontroller and/or microprocessor.

The vehicle guidance system 104 generates the perception data 120 based on at least the image data 152 and the radar data 172. The perception data 120 is, therefore, a real-time detection and a short-term tracking of the dynamic and the static objects in an environment near the vehicle 100. The perception data 120 includes at least the position of other vehicles, pedestrians, traffic lights, and lane markers around the vehicle 100.

The map data 124 includes information based on highly detailed maps containing road infrastructure and geometry. The map data 124 may also include information that the vehicle guidance system 104 uses to determine the speed limit data 180. To bring the map data 124 into relation with other sources of information, such as the perception data 120, is referred to herein as localization, which includes estimating a location of the vehicle 100 on multi-lane roadway 158 with respect to the map data 124.

The speed limit data 180 is generated by the vehicle guidance system 104 based on image data 152 of speed limit roadway signs (not shown). Additionally or alternatively, the speed limit data 180 is received by the vehicle guidance system 104 from the map data 124. The speed limit data 180 corresponds to a maximum speed that is permissible by law on the roadway 158 on which the vehicle 100 has been localized.

Figure 3:
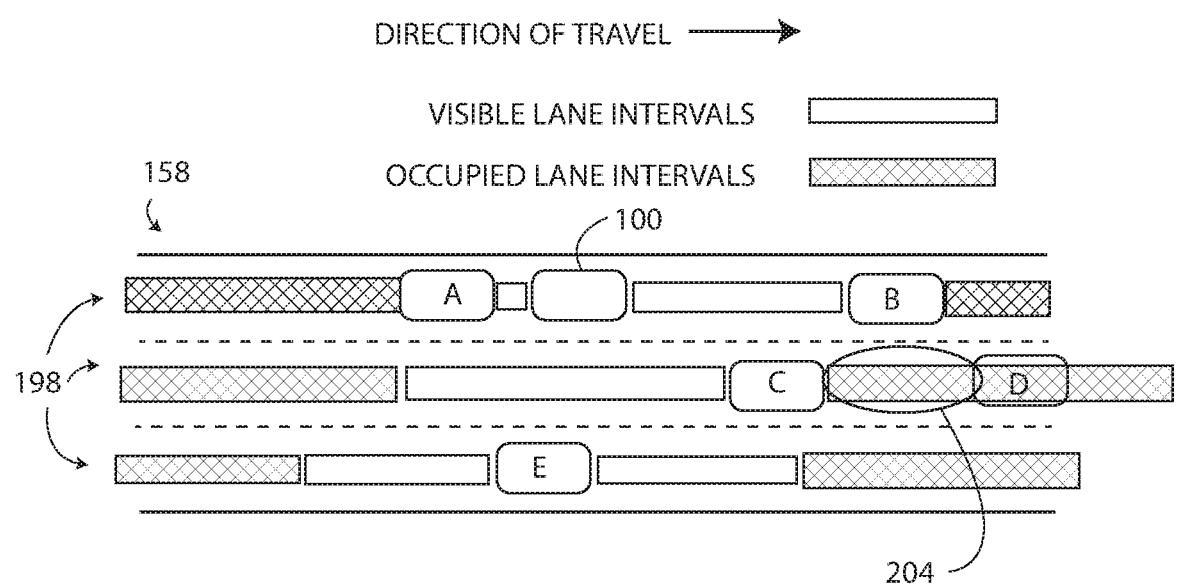
FIG. 3 is a diagram illustrating a top view of the vehicle of FIG. 1 on the roadway of FIG. 2 and identifying visible lane intervals and occupied lane intervals of the roadway.

As shown in FIG. 3, the vehicle guidance system 104 generates the visible lane interval data 184 and the occupied lane interval data 188 based on the perception data 120 and the map data 124. From at least the map data 124, the vehicle guidance system 104 localizes that the vehicle 100 is traveling on the three-lane roadway 158. From at least the perception data 120, the vehicle guidance system 104 determines that the vehicles A, B, C, and E are located near the vehicle 100. In the configuration of FIG. 3, the vehicle guidance system 104 cannot sense the presence of vehicle D because vehicle D is occluded by vehicles B and C. The vehicle guidance system 104, in processing the image data 152 and the radar data 172 of the perception data 120, determines that there are no obstructions in the portions of the roadway 158 identified as the visible lane intervals. In one embodiment, the visible lane intervals are the portions of the roadway 158 in which dynamic objects are absent as determined by the controller 148 of the vehicle guidance system 104 based on the perception data 120. The locations of the visible lane intervals are saved to the memory 144 as the visible lane interval data 184.

The vehicle guidance system 104 determines the locations of the occupied lane intervals of the occupied lane interval data 188 by deduction. That is, as shown in FIG. 3, in one embodiment, each portion of the roadway 158 that is not a visual lane interval is an occupied lane interval. Thus, the occupied lane interval data 188 is the inverse of the visible lane interval data 184, in one embodiment. Moreover, in one embodiment, the position of each dynamic object, such as the vehicles A, B, C, and E, is included in the occupied lane interval data 188. The vehicle guidance system 104 does not consider the space occupied by the vehicles A, B, C, and E to be available for positioning the vehicle 100. In one embodiment, the occupied lane intervals include the portions of the roadway 158 in which a dynamic object is present or may be present, as determined by the controller 148 of the vehicle guidance system 104 based on the perception data 120.

Figure 4:
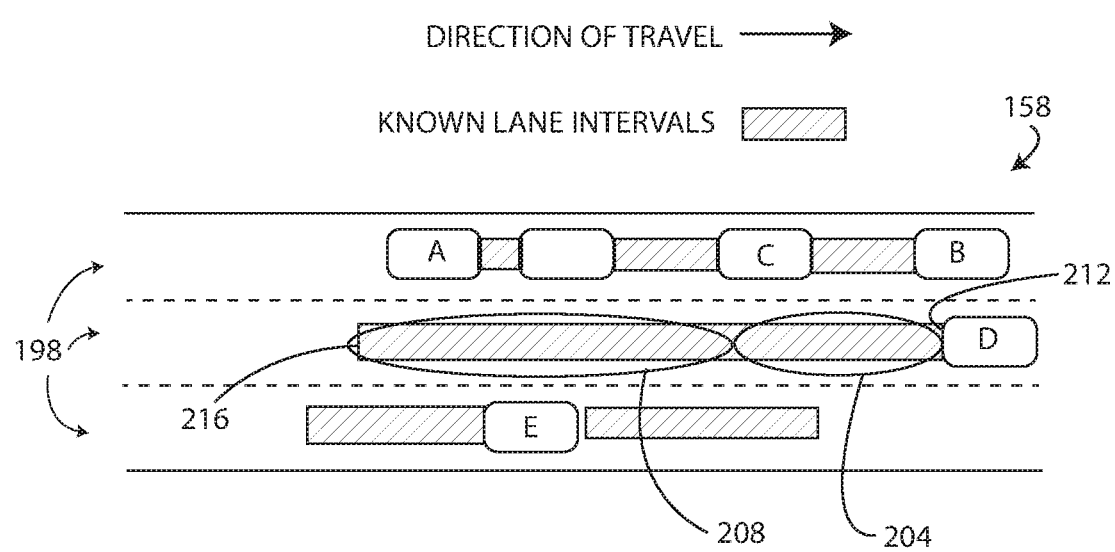
FIG. 4 is a diagram illustrating a top view of the vehicle of FIG. 1 on the roadway of FIG. 2 and identifying known lane intervals of the roadway at a first time.

As shown in FIG. 4, known lane intervals of the known lane interval data 190 are determined by the vehicle guidance system 104 according to a method 500 (FIG. 5) disclosed herein and described in detail below. The known lane intervals are the portions of the roadway 158 that are available to receive the vehicle 100. The known lane intervals are determined over time according to the program instructions 192.

In operation, the vehicle guidance system 104 is configured to make efficient and intelligent decisions using a semantic interpretation of the data 120, 124, 184, 188, 190. Specifically, the vehicle guidance system 104 determines the lane(s) 198 on which perceived dynamic and static objects are located and the position of the dynamic and static objects with respect to a reference frame of the lane 198. The reference frame of the lane 198, in one embodiment, is the current location of the vehicle 100. This enables the vehicle guidance system 104 to determine the lanes 198 of the roadway 158 that are available for the vehicle 100, such when an automated lane change is to be performed.

Moreover, the vehicle guidance system 104 is configured to take into account that there might be obstacles (i.e. dynamic object) that have not been perceived by the vehicle guidance system 104, but that are relevant for decision making because they occupy parts of the lanes 198 that would otherwise be desirable for the vehicle 100. For example, intersections of curvy residential roads with parked cars typically require the vehicle 100 to slowly approach the intersection to see whether pedestrian or vehicular traffic is present. Similarly, the vehicle guidance system 104 recognizes that performing a lane change to a target lane on a German highway without a speed limit may be inadvisable based on a maximum sensing distance of the system 104. When, however, another vehicle is observable in the target lane behind the vehicle 100 and the observed vehicle is driving a similar speed to the vehicle, then the vehicle guidance system 104 recognizes that the other vehicle is effectively protecting and shielding a lane change to the target lane by the vehicle 100.

Figure 5:
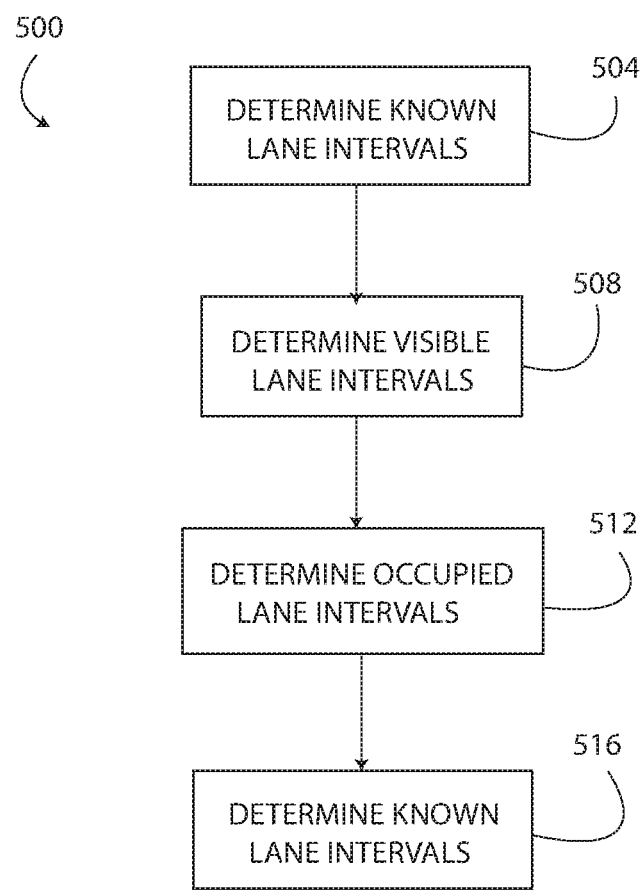
FIG. 5 is a flowchart illustrating a method of operating the vehicle and the vehicle guidance system of FIG. 1.

As shown in FIG. 5, a method 500 for operating the vehicle guidance system 104 is depicted by the flowchart. In block 504, the method 500 includes using the controller 148 of the vehicle guidance system 104 to determine the known lane interval data 190 at a first time. Exemplary known lane interval data 190 is depicted in FIG. 4 as the known lane intervals and includes portions of the lanes 198 of the multi-lane roadway 158 that are available to receive the vehicle 100. In FIG. 4, the vehicle 100 is operated in the leftmost lane 198, which is a selected lane 198. The selected lane 198 is the lane 198 in which the vehicle 100 is being operated.

Next, in block 508, the method 500 includes determining the visible lane interval data 184 at a second time that is after the first time. The visible lane interval data 184 is typically determined with the controller 148 of the vehicle guidance system 104 based on the perception data 120. Thus, the visual lane interval data 184 is determined after the known lane interval data 190 of block 504 is determined. As shown in FIG. 3, the visible lane intervals of the visible lane interval data 184 are portions of the lanes 198 that, according to the imaging device 136 and the radar device 140, are void of dynamic objects and static objects. As explained below, even though the visible lane intervals are "unoccupied," the visual lane intervals may or may not be available to receive to the vehicle 100, and the visual lane intervals may or may not be different from the known lane intervals.

In one embodiment, the visible lane intervals of the visible lane interval data 184 are determined based on preferred driving lines of the lanes 198, and the vehicle guidance system 104 approximates the visible lane intervals as a spatial coverage of the preferred driving lines based on the perception data 120. In other embodiments, a more sophisticated reasoning about the width and height of potentially unobserved vehicles is used to increase the size of the visible intervals.

In block 512 of the method 500, the occupied lane interval data 188 is determined at the second time. With reference again to FIG. 3, according to one definition, the occupied lane intervals are portions of the lanes 198 that are not the visible lane intervals of the vehicle lane interval data 184, and the occupied lane intervals are not available to receive the vehicle 100. According to this definition, the occupied lane intervals include almost every lane 198 of every roadway 158 of the map data 124 except for the visible lane intervals, which are in the view of the vehicle guidance system 104. The method 500 and the vehicle guidance system 104 avoid having to explicitly represent a virtually unbounded space by representing its inverse, which is referred to herein as the known lane interval data 190. The known lane intervals (FIGS. 4, 6, and 7) are the lane intervals of the roadway 158 whose occupation by dynamic objects is completely known and individually represented to the vehicle guidance system 104. The known lane intervals represent free space portions within a lane 158 that is unoccupied and safe for the vehicle 100 to drive in or to change lanes into.

Moreover, in some embodiments, the occupied lane intervals include the portions of the lanes 198 that are occupied by the detected dynamic objects and/or static objects. Additionally or alternatively, in one embodiment, the occupied lane interval data 188 is determined by projecting bounding boxes of all observed and tracked dynamic objects plus a small safety margin onto preferred driving lines of the lanes 198 of the roadway 158.

Next, in block 516, the method 500 includes determining the known lane interval data 190 again (i.e. a second time) based on the visible lane interval data 184 of block 508 and the occupied lane interval data 188 of block 512. Specifically, in each environment modeling process, the known lane intervals data 190 is determined through temporal tracking according to the process provided below.

$K_{t-1:t} \leftarrow$ PREDICT $(K_{t-1}, D_{t-1}, D_t, M)$ $V_t \leftarrow$ COMPUTE VISIBLE LANE INTERVALS $(A_T, M)$ $O_t \leftarrow$ COMPUTE OCCUPIED LANE INTERVALS $(D_T, M)$ $K_t \leftarrow K_{t-1:t} \cup V_t \cup O_t$

RETURN $K_T$

The input to the process is a set of previously known lane interval data $(K_{t-1})$ 190, which is conservatively predicted from a previous cycle, the visible lane interval data $(V_t)$ 184, and the occupied lane interval data $(O_t)$ 188. The output is another set of known lane intervals data $(K_t)$ 190 at the second time that is a union of the predicted previously known lane interval data 190, the current visible lane interval data 184, and the current occupied lane interval data 188. The method 500 determines which parts of the previously known lane interval data $(K_{t-1})$ 190 have been re-occupied and which portions of the lanes 198 have been "swept" or "cleared" by observed and tracked dynamic objects.

The known lane intervals of the known lane interval data 190 are not only temporally tracked in the environment modeling performed by the vehicle guidance system 104, but also predicted together with the observed and tracked dynamic objects for behavioral planning. The known lane interval data 190 are used by the vehicle guidance system 104 in behavioral planning of the vehicle 100 during collision checking by an additional check that ensures that the planned path of the vehicle 100 is fully covered by known lane intervals. That is, the method 500 prevents collisions of the vehicle 100 with unknown dynamic objects, such that the vehicle 100 is prevented from driving into cross traffic with insufficient side visibility or from performing a lane change on a roadway 158 with insufficient rear visibility.

After determining the known lane intervals in block 516 of the method 500, the vehicle guidance system 104 may continue to operate the vehicle 100 in the selected lane 198 (i.e. the leftmost lane 198 in FIG. 4), or may generate inputs to the vehicle 100 that cause the vehicle 100 to move to an adjacent lane 198. As shown in FIG. 4, the center lane 198 next to the vehicle 100 is included as the known lane interval and is an adjacent lane 198 into which the vehicle guidance system 104 may move the vehicle 100.

With reference to FIGS. 3 and 4, the vehicle guidance system 104 is configured to determine when an occupied lane interval has become a known lane interval. For example, in FIG. 3, the occupied lane interval portion 204 is shielded from view by the sensors 136, 140 of the vehicle guidance system 104. When the vehicle C changes lanes from the middle lane 198 to the left lane 198 (as shown in FIG. 4), however, the lane interval portion 204 is converted to a known lane interval. The vehicle guidance system 104 makes this determination because no dynamic objects are detected in the known lane portion 208 and the vehicle D sets a front edge 212 of the known lane interval portion 204. The lane interval portion 204 could not have become occupied by a dynamic object without that dynamic object being detected by the vehicle guidance system 104. Thus, the lane portion 204 is converted from an occupied lane interval to a known interval by the vehicle guidance system 104.

Figure 6:
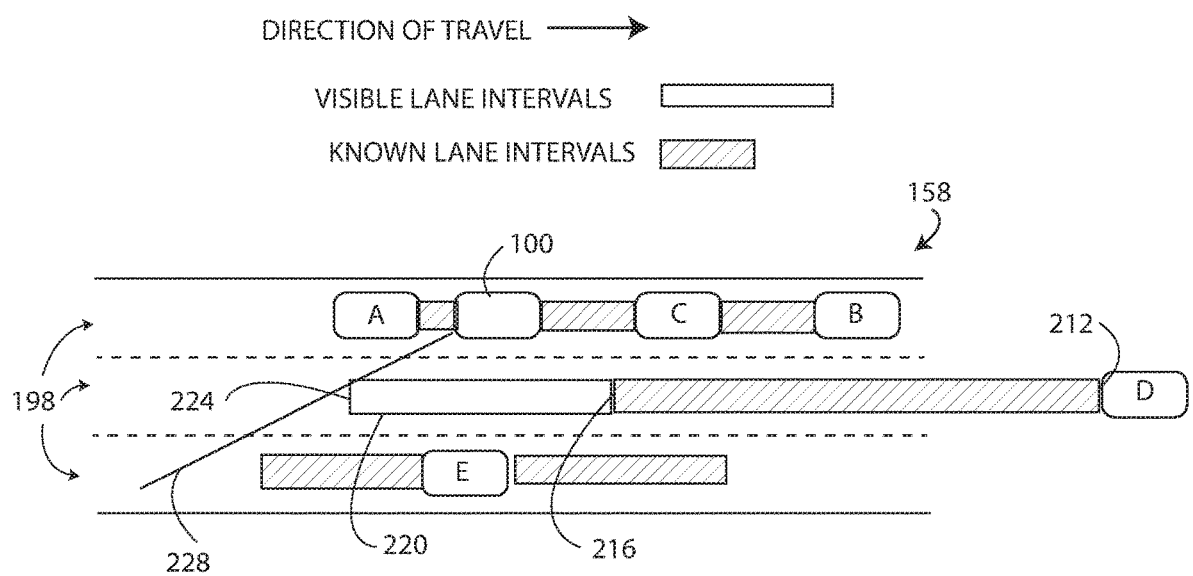
FIG. 6 is a diagram illustrating a top view of the vehicle of FIG. 1 on the roadway of FIG. 2 and identifying known lane intervals of the roadway at a second time.

With reference to FIGS. 4 and 6, the vehicle guidance system 104 is configured to advance the position of a known lane interval based on the speed limit data 180. As shown in FIG. 4, a rear edge 216 of the known lane interval behind vehicle D is determined based on the perception data 120. Using the speed limit data 180 and a duration of time between determining the known lane interval data 190 (i.e. a predetermined time period), the vehicle guidance system 104 advances the position of the known lane interval based on the speed limit of the roadway 158, as is shown by a comparison of the position of the known lane interval in FIGS. 4 and 6. In this way, the vehicle guidance system 104 has determined that the vehicle D has "pulled" the known lane interval forward at a speed corresponding to a speed limit of the roadway 158.

Moreover, with continued reference to FIG. 6, the vehicle guidance system 104 determines that the lane interval 220 is a visual lane interval but not a known lane interval. The lane interval 220 is free from dynamic objects and includes an indeterminate rear edge 224. The rear edge 224 is indeterminate because the rear edge 224 is defined by the field of view 228 of the vehicle guidance system 104 and is not defined by a detected dynamic object. As shown in FIG. 6, the vehicle A obscures the imaging device 136 and the radar device 140 from detecting dynamic objects to the rear of the field of view 228. Thus, an undetected vehicle could be fast approaching in the middle lane 198, thereby creating an unsafe area for the vehicle 100 to change lanes into. For at least this reason, the vehicle guidance system 104 does not determine that the lane interval 220 is a known lane interval in FIG. 6. Accordingly, even though the visual lane interval 220 is free from dynamic objects, the visual lane interval 220 is unavailable for receiving the vehicle 100 (i.e. is not a known lane interval), and, in at least some embodiments, the vehicle guidance system 104 is configured to prevent the vehicle 100 from changing lanes from the selected lane 198 to the visual lane interval 220.

Figure 7:
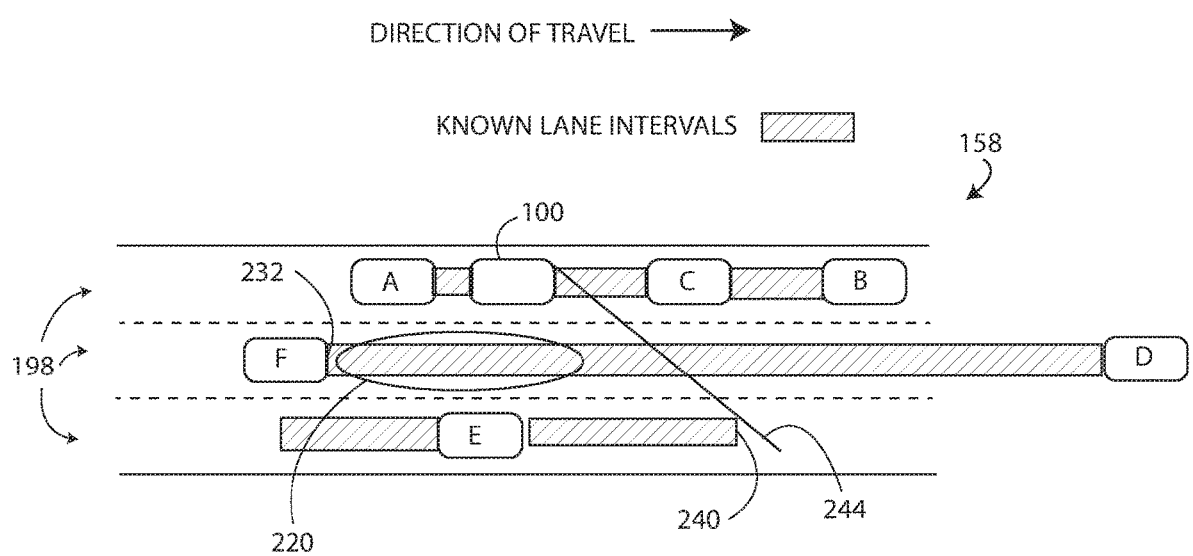
FIG. 7 is a diagram illustrating a top view of the vehicle of FIG. 1 on the roadway of FIG. 2 and identifying known lane intervals of the roadway at a third time.

As shown in FIG. 7, however, the vehicle guidance system 104 has detected the position and the speed of an approaching dynamic object shown as vehicle F. Depending on the speed of the vehicle F, the vehicle guidance system 104 takes at least two actions. First, if the determined speed of the vehicle F is less than or equal to a predetermined speed, such as the speed limit or the speed of the vehicle 100, then vehicle guidance system 104 determines a rear edge 232 of the lane interval 220 corresponding to the position of the vehicle F. Moreover, the vehicle guidance system 104 converts the lane interval 220 to a known lane interval that extends from the vehicle F to the vehicle D. Second, if the determined speed of the vehicle F is greater than the predetermined speed, then the vehicle guidance system 104 determines that the visual lane interval 220 is an occupied lane interval that is unavailable to receive the vehicle 100 during a lane change. In this way, the vehicle guidance system 104 prevents the vehicle 100 from pulling out in front of the fast approaching vehicle F. Moreover, the vehicle F changes the speed at which the rear edge 216 (FIG. 6) is propagated to the detected speed of vehicle F instead of the speed limit, for example. The shielding provided by vehicle F that is detected by the vehicle guidance system 104 makes the vehicle guidance system 104 useful on highways in which some vehicles travel at extremely high rates of speed, such as some German highways.

With additional reference to FIG. 7, the vehicle guidance system 104 does not advance an indeterminate front edge 240 of a known lane interval relative to a position of the vehicle 100. As shown in FIG. 7, the imaging device 136 and the radar device 140 are prevented from detecting dynamic objects in front of a field of view 244 of the vehicle guidance system 104. Thus, the front edge 240 is "indeterminate" because the location of the front edge 240 is based on a vison distance of the vehicle guidance system 104 and not a detected dynamic object. Since there could be an undetected a road hazard (i.e. a static object) or another vehicle (i.e. a dynamic object) that is located just ahead of the front edge 240, the front edge 240 is not advanced beyond the area that is detectable by the vehicle guidance system 104 and is not advanced relative to the position of the vehicle 100 from the first time to the second time. Thus, the vehicle guidance system 104 is configured to maintain the position of the indeterminate front edge 240 relative to a position of the vehicle 100 from the first time to the second time. This approach leads to the vehicle 100 driving at a lower speed and being prepared to stop when, for example, approaching a curve with limited forward visibility, since in the worst case a vehicle is stopped behind the curve.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a vehicle, comprising:
   determining a first plurality of known lane intervals at a first time with a controller of a guidance system of the vehicle, the known lane intervals available to receive the vehicle;
   determining a plurality of visible lane intervals at a second time after the first time with the controller based on perception data generated by the guidance system;
   determining a plurality of occupied lane intervals at the second time with the controller based on the perception data generated by the guidance system;
   determining a second plurality of known lane intervals at the second time as a union of the first plurality of known lane intervals, the plurality of visible lane intervals, and the plurality of occupied lane intervals;
   operating the vehicle in a selected lane; and
   moving the vehicle to an adjacent lane only when the adjacent lane is included in the second plurality of known lane intervals.

2. The method of claim 1, further comprising:
   determining the plurality of visible lane intervals as lane intervals in which a dynamic object is absent as determined by the controller based on the perception data.

3. The method of claim 2, further comprising:
   determining the occupied lane intervals as lane intervals in which a dynamic object is present as determined by the controller based on the perception data.

4. The method of claim 1, further comprising:
   detecting a speed limit of a roadway on which the vehicle is operated as speed limit data with the guidance system; and
   determining a rear edge of each known lane interval of the second plurality of known lane intervals based on the speed limit data.

5. The method of claim 4, further comprising:
   determining a position of a front edge of a known lane interval of the second plurality of known lane intervals, the front edge being an indeterminate front edge that is not based on a position of a corresponding dynamic object; and
   maintaining a position of the indeterminate front edge relative to a position of the vehicle from the first time to the second time.

6. A vehicle guidance system for a corresponding vehicle, comprising:
   an imaging device configured to generate imaging data of a multi-lane roadway; and
   a controller operably connected to the imaging device and configured to (i) determine a first plurality of known lane intervals of the multi-lane roadway at a first time, the known lane intervals available to receive the vehicle, (ii) determine a plurality of visible lane intervals at a second time after the first time based on the image data, (iii) determine a plurality of occupied lane intervals at the second time based on the image data, and (iv) determine a second plurality of known lane intervals at the second time as a union of the first plurality of known lane intervals, the plurality of visible lane intervals, and the plurality of occupied lane intervals,
   wherein the vehicle is operated in a selected lane of the multi-lane roadway, and wherein the controller enables movement of the vehicle to an adjacent lane of the multi-lane roadway only when the adjacent lane is included in the second plurality of known lane intervals.

7. The vehicle guidance system of claim 6, wherein the controller is further configured to determine the plurality of visible lane intervals as lane intervals in which a dynamic object is absent based on the image data.

8. The vehicle guidance system of claim 7, wherein the controller is further configured to determine the occupied lane intervals as lane intervals in which a dynamic object is present based on the image data.

9. The vehicle guidance system of claim 6, wherein the controller is further configured to:
 detect a speed limit of the multi-lane roadway as speed limit data; and
 determine a rear edge of each known lane interval of the second plurality of known lane intervals based on the speed limit data.

10. The vehicle guidance system of claim 9, wherein the controller is further configured to:
 determine a position of a front edge of a known lane interval of the second plurality of known lane intervals, the front edge being an indeterminate front edge that is not based on a position of a corresponding dynamic object; and
 maintain a position of the indeterminate front edge relative to a position of the vehicle from the first time to the second time.

11. A method of operating a vehicle on a multi-lane roadway, comprising:
 operating the vehicle in a selected lane of the multi-lane roadway;
 determining that a visual lane interval of an adjacent lane of the multi-lane roadway is free from dynamic objects and has an indeterminate rear edge with a controller of a guidance system of the vehicle;
 determining that the visual lane interval is unavailable for receiving the vehicle with the controller; and
 preventing the vehicle from changing lanes from the selected lane to the visual lane interval of the adjacent lane with the guidance system.

12. The method of claim 11, further comprising:
 detecting a position and a speed of an approaching dynamic object with the guidance system;
 determining that the speed of the approaching dynamic object is less than or equal to a speed of the vehicle with the controller;
 determining a rear edge of the visual lane interval corresponds to the detected position of the approaching dynamic object with the controller; and
 determining that the visual lane interval having the determined rear edge is a known lane interval available to receive the vehicle during a lane change with the controller.

13. The method of claim 12, further comprising:
 determining that the speed of the approaching dynamic object is greater than the speed of the vehicle with the controller; and
 determining that the visual lane interval is an occupied lane interval that is unavailable to receive the vehicle during a lane change with the controller.

14. The method of claim 11, wherein:
 the vehicle is prevented from changing from the selected lane to the visual lane interval of the adjacent lane even though the visual lane interval is free from dynamic objects as detected by the vehicle guidance system, and
 the dynamic objects include other vehicles located on the multi-lane roadway.

15. The method of claim 11, wherein the vehicle is a fully autonomously-controlled vehicle.

* * * * *